Figure 6:
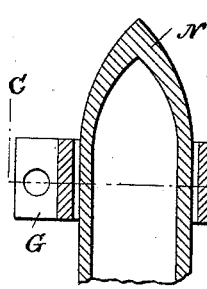

(No Model.) 2 Sheets—Sheet 1.
L. APPERT.
MANUFACTURE OF MOLDED GLASSWARE.
No. 417,306. Patented Dec. 17, 1889.
FIG. 1.
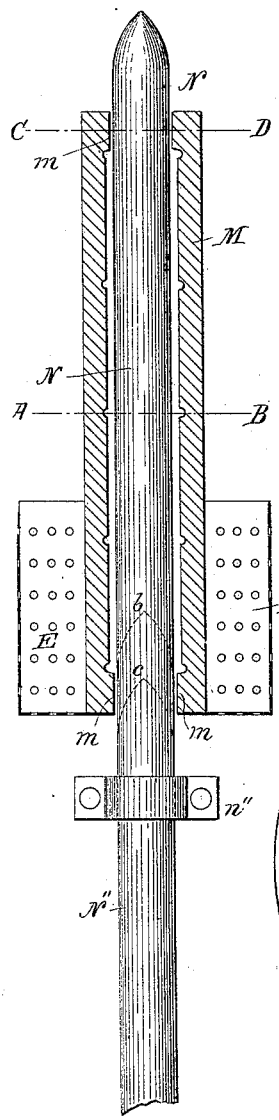
FIG. 2.
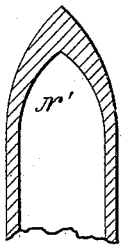
FIG. 3.
FIG. 4.
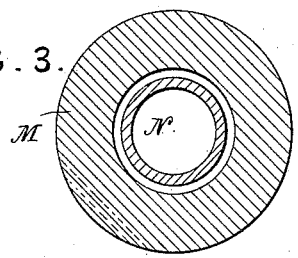
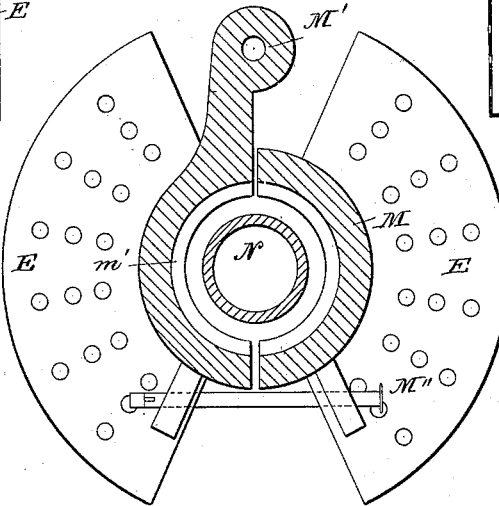
FIG. 5.
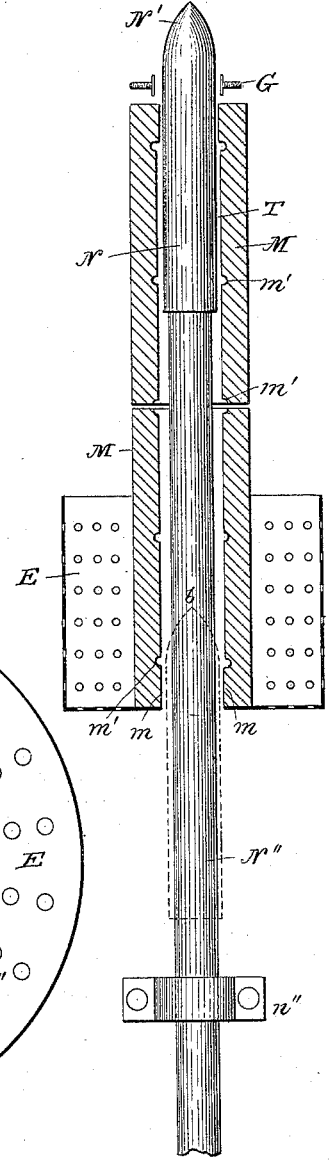
Attest:
Geo. T. Smallwood
Jos. K. Hagmann
Inventor
Léon Appert
by A. Pollok
his attorney (No Model.) 2 Sheets—Sheet 2.

L. APPERT.
MANUFACTURE OF MOLDED GLASSWARE.

No. 417,306. Patented Dec. 17, 1889.

Attest:
Geo. T. Smallwood.
Jos. K. Hagmann.

Inventor:
Leon Appert
by A. Pollok
his attorney

UNITED STATES PATENT OFFICE.

LEON APPERT, OF PARIS, FRANCE.

MANUFACTURE OF MOLDED GLASSWARE.

SPECIFICATION forming part of Letters Patent No. 417,306, dated December 17, 1889.

Application filed September 24, 1889. Serial No. 324,921. (No model.)

*To all whom it may concern:*

Be it known that I, LEON APPERT, of Paris, Republic of France, have invented new and useful Improvements in the Manufacture of Molded Glassware, which are fully set forth in the following specification.

My invention relates to a new process or method of molding glass, which I call the "progressive method," and which is adapted to the manufacture of articles of all sorts open at either or both ends—such as tubes, pipes, cylinders, vases, vats, barrels, and the like—of any height or depth, and which method consists, essentially, in the employment of a mold, open or closed at either end, into which the fluid glass is poured and molded progressively by the introduction from below and motion upwardly of a core of suitable form and dimension.

It has been proposed heretofore to form hollow articles of glass by progressive molding under the action of a core moving upwardly in a mold, into which the glass is poured at the top; but no means have been provided, so far as I am aware, for overcoming certain difficulties of a practical nature that present themselves in attempting to practice this method. If the inside wall of the mold be smooth, the core tends to push the glass upward, instead of compressing it against the wall of the mold; hence it is necessary to provide some means for resisting this tendency. I accomplish this object by providing the interior of the mold with transverse grooves or indentations, which retain the glass in the mold and prevent its being drawn or carried away by the core. The present invention includes this and other improvements, whereby the progressive molding of hollow articles of considerable length can be practically carried out. Being capable of resisting perfectly the action of most destructive agents and of being readily and thoroughly cleansed from all infectious germs, glass is the substance eminently suitable for use in the manufacture of various domestic utensils and of many articles for public or private use. Moreover, glass can be obtained at a very low price, and this fact, particularly in countries lacking in mineral elements for the production of metals, gives great value to a method which will allow of its being utilized in the manufacture of articles of large consumption, such as piping for the supply of water or gas to cities, and for carrying off of the waste from houses, &c.

Particularly is the adaptation of this invention to the manufacture of tubing or piping important, since it can be produced economically, obviating the difficulties which attend the manufacture of metal tubing or piping where it is necessary to use many expensive joints, which are always liable to breakage and rupture, as it would be impossible to make pieces of great length without largely increasing the thickness and weight of the metal, and thus proportionately enhancing the cost of production. Taking into consideration, also, that the molding of glass is resorted to as a means of avoiding the cost of highly skilled and expensive labor, and that molding, as heretofore practiced, is only applicable to objects of small dimensions, the importance of this invention will be readily appreciated.

To facilitate the understanding of the manner in which this invention may be carried out, I have illustrated in the accompanying drawings its application to the manufacture of an open article—such as a tube or pipe—and a closed article—such as a battery-vessel.

Figure 7:
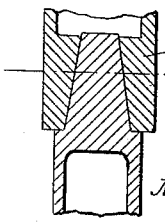
Figure 8:
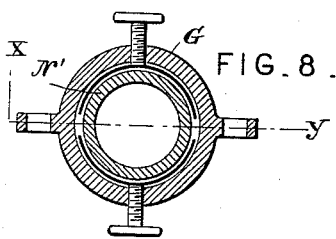
Figure 9:
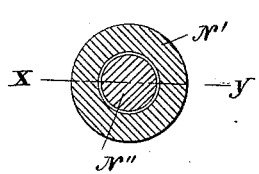
Figure 9:
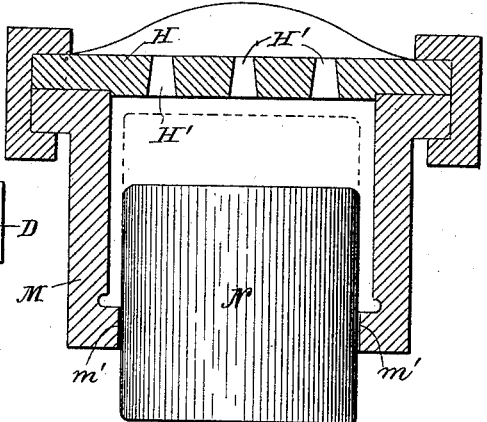
Figure 10:
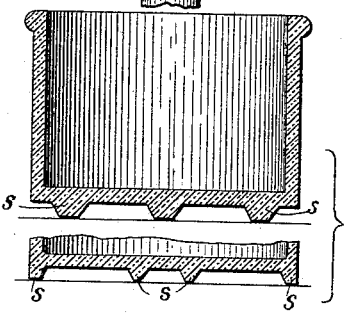
Figure 11:
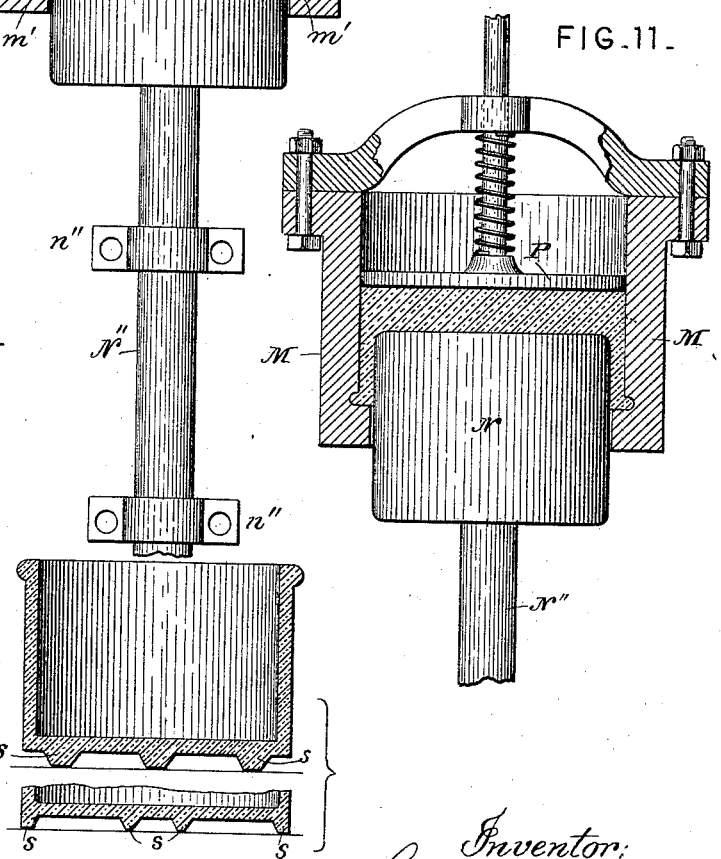

In the drawings, Figure 1 is an elevation, partly in section, of the apparatus used for molding progressively piping of glass, the core being shown in full lines at its maximum of elevation and in dotted lines at *b* at the moment the glass is poured into the mold, and at *c* when the finished glass is removed from the mold. Fig. 2 is a vertical section, on an enlarged scale, of the conical end of the core. Figs. 3 and 4 are cross-sections on lines C D and A B of Fig. 1 on the same enlarged scale as in Fig. 2 of the apparatus. Fig. 5 is a longitudinal section of the apparatus with cylindrical core in two pieces, so as to be capable of being dismembered, and which is used for piping of greater length, the core being shown in full lines at its maximum height of elevation and in dotted lines at *b* at its position when the glass is introduced into the mold. Fig. 6 is a vertical section, on an enlarged scale, of the top of the core on line *x y* in Figs. 7 and 8, which are transverse sections on lines C D and A B in Fig. 6. Fig. 9 represents a vertical section of an apparatus for molding a vat or piece of glass open at but one end. Fig. 10 shows in section the molded piece completed. Fig. 11 is a modification of Fig. 9, which will be hereinafter referred to.

The following is the process as practiced by me for the molding of pieces hollow and open at both ends.

I use a hollow cylindrical metallic mold M, the interior of which corresponds to the exterior form of the pipe or piece to be obtained. This mold is divided lengthwise into one or more parts to open, as shown in Figs. 4 and 5, by means of hinges M' of sufficient number to allow of the perfect closing and opening of the mold and of the delivery of the glass pipe when molded. The mold when closed may be secured by bolts M'' passing through lugs adapted to the different parts of the mold. A double perforated envelope or casing E surrounds the lower end of the mold in order to permit of its heating or cooling.

The length of the mold M is determined by the length of the pipe to be produced. It should, however, be increased by the bearings $m$ $m$ at each extremity, which project above or below to serve as guides to the movable core. Transverse hollow channels $m'$ are provided in the walls of the mold at the extremities, and also at certain intervals between the extremities, to retain the molten glass during the pouring and molding, and thus prevent the glass from being drawn or carried away by the core. These channels, which may be replaced by any other form of depression, serve to form upon the glass pipe flanges or other strengthening or decorative ribs.

The mold is erected vertically in the molding-room near the furnace and at a height above the flooring to enable its being easily filled through the top opening. It is firmly held by a rigid frame in such manner as to allow of the ready closing and opening of the mold.

The mold is traversed by a metallic core N, either solid or hollow, slightly conical, and having for its exterior form and dimension the interior form and dimension of the pipe to be made. The core N has a length equal to that of the mold M increased by a few centimeters, sufficient to allow of the ogival-formed point N' to emerge from the mold. It is this point that facilitates the penetration of the core into and its passage through the molten mass of glass. The cylindro-conical point is connected, as shown, with a cylindrical core or stem N'', which is truly guided by collars or guides $n''$ to maintain its axial relation to the mold. This stem is actuated by proper mechanism driven by steam, water, or compressed air. The mold being closed and the core withdrawn to its lowest position of its course—i. e., at a height such that the stem or cylinder of smaller dimension shall be at a level with the shoulder of the lower bearing (position $b$, Figs. 1 and 5)—the glass is poured by means of a ladle in sufficient quantity to form a pipe. Upward movement is then imparted to the core, which compels its passage through the mass of glass which was just or is being poured in, forcing it at the same time against the walls of the mold, and the excess of glass rising and being molded successively and progressively as the core advances until the moment when, the cylindrical portion of the core having reached the extremity of its course—that is to say, at the level of the lower portion of the upper bearing $m$—the excess of the glass is cut and thrown off upon the point of the core N'. The pipe thus finished is removed from the mold by first withdrawing the core, then opening the mold and seizing the pipe with a pair of tongs previously heated. It is then plunged into a tempering-bath or a reheating-furnace.

When the pipe is not of very great length, the core may be made of a single piece of a cylindro-conical form, as shown in Fig. 1.

When the pipe is to be of great length, as in Fig. 5, it is preferable, in order to avoid cracking or breaking in consequence of the cooling or chilling of the glass at the lower end, which is first molded, to have the core made of two pieces N' N'', Fig. 6, so that the two cylindrical portions may be removed from the mold each at one of its extremities.

The upper portion N of the core is cylindrical, and has for its diameter the interior diameter of the piece. It is provided with the ogival point N', as in the former case. This portion N' is hollow, and fits a tenon on the upper part of the lower portion or stem N'', which is also cylindrical, but of a diameter less than that of the core-piece or upper portion N'. These two portions should be made to separate when drawn apart with utmost ease. The molding with this apparatus is effected in the same manner as with the one previously described, with this difference, that when the core has come to the end of its upward stroke, the excess of glass having been removed, the upper portion of the core is taken hold of by a nipper or clutch G, Fig. 5, and lifted off its seat on the lower portion and out of the mold. At the same time the lower portion of the core is dropped out of the mold and the molded piece, and the mold is then opened and the molded pipe removed. The use of the core in two sections has not only the advantage of permitting the molding of pieces of greater length, but also of producing pipes perfectly cylindrical from one end to the other. This process of molding is also applicable to the manufacture of any object of glass of any dimensions closed at one end. For this purpose glass is poured in the manner heretofore described into the mold M, Fig. 9, which is provided with a cover H. The latter has the lower side formed to correspond to the bottom of the piece to be formed. It is solidly fastened to the mold by clamps or other convenient means. The core, ascending, forces the glass back against the cover. Openings H', of suitable shape, allow the imprisoned air, as well as the excess of glass, to escape through the cover. These openings will produce projections S, Fig. 10, which can be removed or properly planed or ground to form legs or supports for the vessel to stand upon. The removal of the piece from the mold is effected by the withdrawal of the core and opening the mold, as heretofore stated, with reference to pipe-molding.

The thickness of the piece or the form of its bottom may for the reason of the great fluidity of the material, or for any other cause, imperfectly take the impress of the mold or of the decorative configurations of the same, the pressure produced by the weight of the material upon the core being insufficient. In such case it is recommended, instead of the cover, to place upon the surface of molten glass a metallic plate P, (see Fig. 11,) fitting inside the mold with sufficient play to slide easily. This plate should be of a weight or weighted or acted upon by a spring to offer the necessary resistance to the proper molding of the quantity of glass to be fashioned into a given form. This metal plate partakes of the upward movement of the glass and the core. It may, to allow the escape of the air and the excess of glass, be provided with vents, which, however, should be regulated to prevent ejection of more than is desired of the mass of glass. To this end they may be kept closed during part of the ascension and opened only when the core approaches the limit of the upward movement.

It will be understood that I do not limit myself to particular forms, dimensions, or other details of construction.

Having now fully described my said invention, what I claim, and desire to secure by Letters Patent, is—

1. The combination, with the core, of a mold open below for admission of said core and provided with lateral grooves or depressions at such intervals as to retain the glass during the ascent of the core, substantially as described.

2. The combination, with the mold, of substantially the same diameter throughout, said mold being open at the bottom, of the core adapted to traverse the mold from the bottom upward, said core being divided transversely into two parts which are separable from each other, so that they can be withdrawn in opposite directions, substantially as described.

3. The combination, with the core, of a mold open at its lower end for the introduction thereof, and provided with a movable cover arranged to oppose a yielding resistance to the glass as impelled upward by the core, substantially as described.

4. The combination of an elongated mold open at the bottom, a core adapted to move upwardly through the mold, and means for applying heat around the lower part of the latter, substantially as described.

In testimony whereof I have signed this specification in the presence of two subscribing witnesses.

LEON APPERT.

Witnesses:
ANTHONY POLLOK,
B. J. AUSTIN.